United States Patent

Tarumi et al.

Patent Number: 5,880,974
Date of Patent: Mar. 9, 1999

[54] MERCHANDISE SIMULATOR SYSTEM AND DEVICES

[75] Inventors: Hiroaki Tarumi; Keiko Shimazu; Hiroshi Okano, all of Kanagawa, Japan

[73] Assignee: Fuji Xerox Co., Ltd., Tokyo, Japan

[21] Appl. No.: 733,939

[22] Filed: Oct. 18, 1996

[30] Foreign Application Priority Data

Oct. 20, 1995 [JP] Japan .................................. 7-272786
Oct. 2, 1996 [JP] Japan .................................. 8-261929

[51] Int. Cl.$^6$ ...................................................... G06F 9/455
[52] U.S. Cl. ............................................................ 364/578
[58] Field of Search .............................. 395/500; 364/578

[56] References Cited

U.S. PATENT DOCUMENTS

| | | | |
|---|---|---|---|
| 4,949,286 | 8/1990 | Ohba | 345/425 |
| 4,954,976 | 9/1990 | Noonan | 364/578 |
| 5,280,570 | 1/1994 | Jordan | 395/135 |
| 5,615,318 | 3/1997 | Matsuura | 395/120 |
| 5,644,204 | 7/1997 | Nagle | 318/568.12 |

FOREIGN PATENT DOCUMENTS 6-348791  12/1994  Japan .

*Primary Examiner*—Vincent N. Trans
*Assistant Examiner*—Ayni Mohamed
*Attorney, Agent, or Firm*—Finnegan, Henderson, Farabow, Garrett & Dunner, L.L.P.

[57] ABSTRACT

A merchandise simulator device which allows a user to operate a desired piece of merchandise on a user's terminal as if the user was using the piece actually at hand. In the merchandise simulator device, when a workstation executes merchandise simulation software received from an HTTP server, a merchandise simulation control section is activated on the workstation to thereby display the basic image of a selected piece of merchandise in a display section. If a drag operation is carried out by a mouse of an input section, then the piece of merchandise displayed on the display section is rotated on the basis of two or more pieces of image data received from the HTTP server and also, if a mouse input is given to a button or the like of the image data displayed on the display section, then the function of the piece of merchandise displayed in the display section is simulated in whatever display state the present piece is.

5 Claims, 8 Drawing Sheets

FIG. 6

| CONTENTS OF OPERATION | DISPLAY ON LED 41 |
|---|---|
| 601 — CLICK POWER SUPPLY BUTTON WITH MOUSE | 場面を選んで下さい — 602 |
| ↓ | |
| 603 — CLICK SCENE BUTTON WITH MOUSE | 観光娯楽<br>1. 観光案内 — 604 |
| ↓ | |
| 605 — CLICK SET BUTTON WITH MOUSE | 観光案内所はどこですか？ — 606 |
| ↓ | |
| 607 — CLICK ENGLISH BUTTON WITH MOUSE | Execuse me, but where's the tourist information counter? — 608 |

|  | IMAGE DATA 1 | IMAGE DATA 2 | IMAGE DATA 3 | ------- |
|---|---|---|---|---|
| POWER SUPPLY BUTTON | $x_0, y_0$ | $x_0', y_0'$ | $x_0'', y_0''$ | ------- |
| RESET BUTTON | $x_1, y_1$ | $x_1', y_1'$ | $x_1'', y_1''$ | ------- |
| CHINESE BUTTON | $x_2, y_2$ | $x_2', y_2'$ | $x_2'', y_2''$ | ------- |
| JAPANESE BUTTON | $x_3, y_3$ | $x_3', y_3'$ | $x_3'', y_3''$ | ------- |
| ENGLISH BUTTON | $x_4, y_4$ | $x_4', y_4'$ | $x_4'', y_4''$ | ------- |
| ⋮ | ⋮ | ⋮ | ⋮ | ⋮ |
| VOICE BUTTON | $x_n, y_n$ | $x_n', y_n'$ | $x_n'', y_{0n}''$ | ------- |

MERCHANDISE SIMULATOR SYSTEM AND DEVICES

BACKGROUND OF THE INVENTION

1. Field of the Invention

The present invention relates to a merchandise simulator system and a merchandise simulator device which are able to provide merchandise information on the outer appearance, function and the like of a selected piece of merchandise without actually touching the piece of merchandise and, in particular, to a merchandise simulator system and device in which a user can display a selected piece of merchandise on the display section of a user's terminal with a plurality of view points by operating the user's terminal, and, by executing a simulation input with respect to the operation part of the thus displayed piece of merchandise, the user terminal can carry out a simulation operation on the various functions of the displayed piece of merchandise, thereby allowing the user to perform an operation to confirm the outer appearance, function and the like of the present piece.

2. Description of the Related Art

Generally, in order to obtain merchandise information on the outer appearance, function and the like of a certain piece of merchandise, a user sees the piece of merchandise actually to thereby know the outer appearance thereof and operates the operation part of the piece practically to thereby know the function thereof.

However, to see and operate the piece actually, the user must go to a place where the piece is exhibited, which is inconvenient for the user. Especially, under the recent market circumstances in which various kinds of merchandise have been widely developed and supplied, it is difficult for the user to obtain accurate merchandise information on a desired piece of merchandise efficiently and positively.

There exists a conventional device which allows the user to know the outer appearance of a desired piece of merchandise without actually touching it, for example, there is known a videotex terminal device which is disclosed in Japanese Patent Unexamined Publication No. Sho. 63-6986 (which will be hereinafter referred to as "first prior art"). According to the first prior art, the videotex terminal device is structured such that a plurality of images obtained by viewing the same object from different directions are stored therein, and the image of the present object viewed from a specified direction is displayed on a display unit.

Also, as another conventional technology, as disclosed in Japanese Patent Unexamined Publication No. Hei. 5-225354 (which will be hereinafter referred to as "second prior art"), there is known a three-dimensional graphic display device which is structured such that, when a three-dimensional figure displayed by shaded representation on a display is rotated, moved, enlarged or reduced, the shaded figure is temporarily switched over to a wire frame representation, in which the shape of the figure is represented only by lines, and is rotated, and, after rotation, the wire frame representation is returned back to the shaded representation.

That is, if these prior art technologies are used, then the outer appearance of the piece of merchandise can be exhibited to users from various angles, which makes it possible for the users to understand the outer appearance of the piece from diversified angles.

However, the additional value of the piece of merchandise depends not only on the outer appearance thereof but also on the essential function thereof and, therefore, even if the outer appearance of the piece is exhibited in a diversified manner using the above-mentioned prior art technologies, such exhibition is not sufficient for the users.

In view of this, in Japanese Patent Unexamined Publication No. Bei. 6-41805 (which will be hereinafter referred to as "third prior art"), there is disclosed a coordinate device which is structured such that the personal data of a user and the merchandise information specified by the user are transmitted to a sales agent, while the sales agent makes up the image and pressure data of the merchandise corresponding to the personal data of the user and the specified merchandise information and then sends them to the user.

That is, according to the third prior art, not only the outer appearance of the piece of merchandise such as a dress or the like is displayed, but also an image representing the appearance of the user when the user wears the dress is displayed on a display and, in accordance with the pressure data indicating the wearing feeling of the user, a pressure is applied to a pressure device which is attached to the user.

Further, in Japanese Patent Unexamined Publication No. Hei. 5-274326 (which will be hereinafter referred to as "fourth prior art"), there are disclosed merchandise presentation method and device in which various pieces of merchandise catalog information are stored in the form of electronic multi-media information such as texts, graphics, still images, moving images, voices and the like, and, in response to a retrieval request from a user, the merchandise information can be supplied on an interactive basis.

That is, according to the fourth prior art, by supplying the user with the multi-media information on the merchandise on an interactive basis, visual support can be given to the user in customizing the merchandise.

As represented by the above-mentioned third and fourth prior art technologies, in recent years, it has been important that not only the information on the outer appearance of a piece of merchandise is exhibited but also the information on the function of the piece is supplied as if the user was actually using the piece.

However, according to the above-mentioned third prior art, there is required hardware such as a pressure device and the like and, therefore, the application range of the third prior art is limited to a specific field such as clothes or the like, which makes it difficult for the third prior art to be applied to various kinds of merchandise.

Further, the fourth prior art is truly suitable to customize the color of the merchandise or the combination of different pieces of merchandise, but it does not allow the user to simulate the function of the merchandise itself.

Therefore, it is now important how to provide the user with the information on the functions of various kinds of merchandise as if the user was actually using the present one.

Especially, in recent years, the WWW (World Wide Web) is in the limelight as an information supply tool on the INTERNET which is a worldwide scale network and, therefore, it is important to simulate the functions of the merchandise to be publicized in the WWW.

That is, in the WWW, if various member terminals request information on selected one or more pieces of merchandise through the INTERNET from an HTTP (Hyper Text Transfer Protocol) server which makes public various kinds of information on merchandise, then the terminals are able to obtain various kinds of public data such as texts, images, voices and the like and, in view of this, various kinds of information on new products developed by various enterprises have been recently registered in the HTTP server.

Thus, if there can be introduced a system which allows the merchandise to be simulated as if a user was actually using the merchandise through the WWW, then the value of use of the WWW with respect to the merchandise can be enhanced further.

SUMMARY OF THE INVENTION

The present invention aims at eliminating the above-mentioned drawbacks found in the prior art technologies. Accordingly, it is an object of the invention to provide a merchandise simulator system and a merchandise simulator device which allows a user to operate a desired piece of merchandise on a user terminal as if the user was using the piece actually.

In attaining the above object, according to a first aspect of the invention, there is provided a merchandise simulator system comprising a server for supplying image data and simulation software of a piece of merchandise, and a client including a display section for displaying the piece of merchandise, an input section for carrying out a position instruction in the display section and a browser for requesting information on the piece of merchandise to the server, the server and client being connected to each other through a network, wherein the server comprising: storage means for storing therein two or more pieces of image data on the piece of merchandise obtained when the piece of merchandise is viewed from a plurality of view points, position information of an operation part of the piece of merchandise in each of the two or more pieces of image data, and simulation software not only for displaying image data, which are obtained when the piece of merchandise to be displayed is displaced by a given angle in response to a given input operation executed on the piece of merchandise, but also for simulating an operation of the piece of merchandise corresponding to the input operation of the operation part of the piece of merchandise in response to a position instruction given to the operation part of the piece of merchandise being displayed; and transmission means for transmitting the image data, position information and simulation software respectively stored in the storage means to the client in response to a request from the client.

According to a second aspect of the invention, there is provided a merchandise simulator device comprising a display section for displaying a piece of merchandise and an input section for executing a position instruction in the display section, for simulating an operation of the piece of merchandise when a given operation is executed on an operation part provided in the piece of merchandise, the merchandise simulator device further comprising: display control means for display controlling a state of the piece of merchandise displayed on the display section in such a manner that the piece of merchandise is rotated by a given angle when a given input operation is executed on the piece of merchandise displayed on the display section by the input section; and simulating means for simulating the operation of the piece of merchandise corresponding to the operation of the operation part of the piece of merchandise when a position instruction is given by the input section to the operation part of the piece of merchandise to be display controlled by the display control means.

According to a third aspect of the invention, there is provided a merchandise simulator device comprising a display section for displaying a piece of merchandise and an input section for executing a position instruction in the display section, for simulating an operation of the piece of merchandise when a given operation is executed on an operation part provided in the piece of merchandise, the merchandise simulator device further comprising: storage means for storing therein two or more pieces of image data on the piece of merchandise obtained when the piece of merchandise is viewed from a plurality of view points; display control means for taking out image data on the piece of merchandise obtained when the view point of the piece of merchandise is displaced by a given angle and display controlling the taken-out image data when a given input operation is executed on the piece of merchandise displayed on the display section by the input section; control means for controlling position information of the operation part in each of the two or more pieces of image data stored in the storage means; and simulating means for simulating the operation of the piece of merchandise corresponding to the operation of the operation part in accordance with the position information controlled by the control means when a position instruction is given by the input section to the operation part of the piece of merchandise to be display controlled by the display control means.

According to a fourth aspect of the invention, there is provided a merchandise simulator device comprising a display section for displaying a piece of merchandise and an input section for executing a position instruction in the display section, for simulating an operation of the piece of merchandise when a given operation is executed on an operation part provided in the piece of merchandise, the merchandise simulator device further comprising: storage means for storing therein image data on the piece of merchandise obtained when the piece of merchandise is viewed from a given view point; calculating means for calculating not only two or more pieces of image data on the piece of merchandise displayed on the display section obtained when the view point of the displayed piece is displaced sequentially by a given angle but also the position information of the operation part in each of the respective pieces of image data; display control means for displaying controlling the image data calculated by the calculating means and corresponding to a given input operation by the input section when the input operation is executed by the input section on the piece of merchandise displayed on the display section; and simulating means for simulating the operation of the piece of merchandise corresponding to the operation of the operation part of the piece of merchandise in accordance with the position information calculated by the calculating means when a position instruction is given by the input section to the operation part of the piece of merchandise to be display controlled by the display control means.

BRIEF DESCRIPTION OF THE DRAWINGS

FIG. 6 is an explanatory view of a merchandise simulating operation to be carried out by use of the translator shown in FIG. 4;

FIG. 7 is a view of an example of a table to be used by a simulation processing section shown in FIG. 1;

DETAILED DESCRIPTION OF THE PREFERRED EMBODIMENTS

Now, description will be given below of embodiments of the invention with reference to the accompanying drawings. Here, the illustrated embodiments show cases where the present invention is applied to the WWW which is to be operated on the INTERNET.

Figure 1:
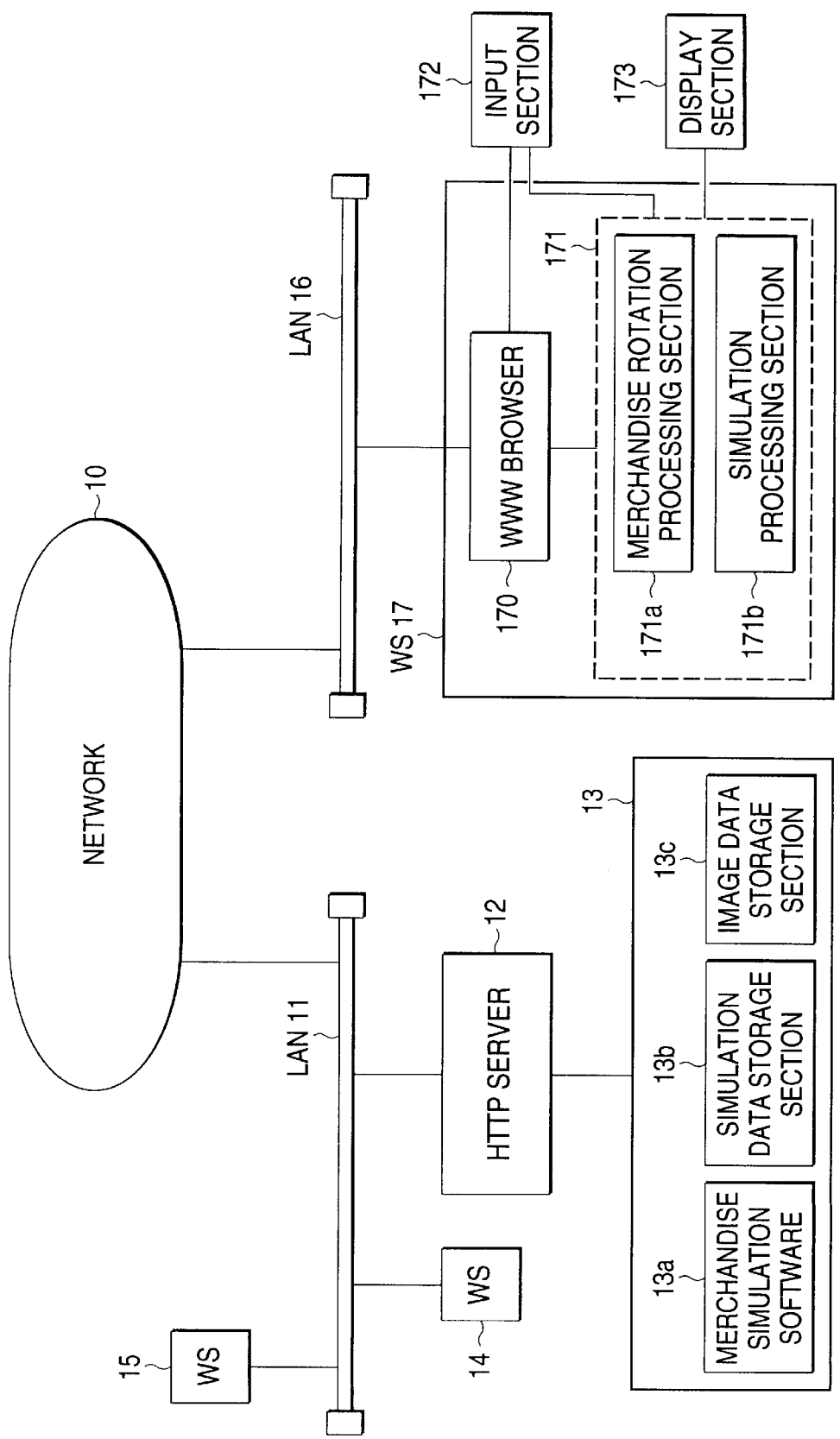
FIG. 1 is a block diagram of the whole structure of a merchandise simulator system used in a first embodiment of the invention.

FIG. 1 shows a block diagram of the whole structure of a merchandise simulator system used in a first embodiment of the invention. In the first embodiment, it is assumed that an HTTP server 12 previously stores therein two or more pieces of image data obtained when the outer appearance of a piece of merchandise, that is, a commodity is viewed from a plurality of different view points.

The present merchandise simulator system is a system in which, when a work station (which will be hereinafter referred to as "WS") 17, which is a member of a LAN 11, a LAN 16 and a network 10 (which will be hereinafter collectively referred to as "INTERNET"), requests information on a selected piece of merchandise to the HTTP server 12 using a WWW browser 170, then the WS 17 receives simulation software on the present piece as well as image data on the outer appearance of the present piece from HTTP server 12, and simulates the present piece on the WS 17 itself.

In particular, in the present merchandise simulator system, not only the outer appearance of the selected piece of merchandise can be simply displayed on the WS 17 but also the function of the piece can be carried out on the WS 17.

For example, if a piece of merchandise displays a message on an LED when one of its various buttons is depressed and if a desired button for the present piece of merchandise displayed on a display section 173 is clicked by a mouse, then the message is displayed on the LED portion of the displayed piece.

Also, in the case of another piece of merchandise for which a message corresponding to a depressed button is issued by means of voice, if a desired button for the piece displayed in the display section 173 is clicked by a mouse, then the voice corresponding to the message is issued.

However, the present merchandise simulator system is structured such that not only the basic image (front view or the like) of the piece of merchandise can be input by a mouse but also other images of the piece can be input by the mouse while properly rotating the piece in the lateral or longitudinal direction thereof.

That is, with use of the present merchandise simulator system, not only the whole periphery of the outer appearance of the piece of merchandise can be visually confirmed, but also various switches and buttons provided on the front surface, side surfaces and back surface of the piece can be operated by use of the mouse.

As shown in FIG. 1, the merchandise simulator system according to the present embodiment is structured such that the WS 17 belonging to the LAN 16 is connected through the INTERNET to the HTTP server 12 belonging to the LAN 11.

The HTTP server 12 is a server which supplies information on various kinds of merchandise described in a page description language to the WS 17 including a WWW browser 170. The server 12 includes a storage unit 13 which in turn includes merchandise simulation software 13a, a simulation data storage section 13b, and an image data storage section 13c.

The merchandise simulation software 13a is software which can be activated on the WS 17 that simulates the function of the piece of merchandise, while the software 13a has not only a function to rotate the outer appearance of the piece in a desired direction and display the thus rotated outer appearance but also a function to simulate the function of the piece.

It should be noted here that the merchandise simulation software 13a is not activated on the HTTP server 12 but is activated on the WS 17 which is used to simulate the function of the piece.

In particular, if the WS 17 issues an information request while specifying a certain piece of merchandise, then the merchandise simulation software 13a is transferred to the WS 17 in response to this information request. If the merchandise simulation software 13a is executed on the WS 17, then a merchandise simulation control section 171 shown by a broken line in FIG. 1 is activated. That is, FIG. 1 shows that the merchandise simulation control section 171 shown in the above-mentioned WS 17 is a function section which is allowed to fulfill its function only when the merchandise simulation software 13a is activated on the WS 17.

The merchandise simulation software 13a contains therein a table which has the position coordinates of various switches, buttons and the like of the piece of merchandise contained in the image data, the position coordinates corresponding to each of the image data stored in the image data storage section 13c, while such a table is used to recognize which one of the merchandise switches or buttons is selected by a mouse.

Also, the simulation data storage section 13b is a storage area in which various pieces of data necessary for processing of the merchandise simulation software 13a are stored, for example, voice data described in a page description language HTML (Hyper-Text Markup Language) is stored.

Further, the image data storage section 13c is a storage area in which one or more sets of image data representing the outer appearance of the piece of merchandise when it is viewed from various different angles and, specifically, various pieces of image data on the piece obtained by rotating the piece successively by a given angle with respect to the rotary axes thereof in the lateral or longitudinal direction are stored.

Due to the fact that the above-mentioned merchandise simulation software section 13a, simulation data storage section 13b, and image data storage section 13c are included in the storage unit 13 of the HTTP server 12, the function to simulate the piece of merchandise can be supplied to the respective INTERNET member terminals each including the WWW browser.

The WS 17 is a device which requests information on the piece of merchandise to the HTTP server 12, while it includes a WWW browser 170, a merchandise simulation control section 171, an input section 172, a display section 173 and the like. However, the merchandise simulation control section 171 shown by a broken line is allowed to carry out its function only when the merchandise simulation software 13a received from the HTTP server 12 is activated.

The WWW browser 170 is software which receives documents, images, voice files and the like described in the HTML and held in the HTTP server 12 and encodes the contents thereof. For example, the HotJava# browser, which has been developed by SUN MICROSYSTEMS, INC. or the like can be used as the WWW browser 170. Hotjava and Sun Microsystems are trademarks or registered trademarks of Sun Microsystems Inc. in the United States and other countries.

Concretely, if the WS 17 activates the WWW browser 170 to request a home page to the HTTP server 12, then the HTTP server 12 transmits the requested home page to the WS 17.

Then, if the WS 17 requests information on a desired piece of merchandise to the HTTP server 12 in accordance with the home page, the HTTP server 12 transmits the merchandise simulation software, simulation data and image data respectively stored in the storage unit 13 to the WS 17.

As described above, the merchandise simulation control section 171 is a function section which is allowed to carry out its function only when the merchandise simulation software 13a received from the HTTP server 12 is activated, and this section 171 includes a merchandise rotation processing section 171a which rotates the piece of merchandise displayed on the display section 173 in a desired direction, and a simulation processing section 171b which simulates the respective functions of various pieces of merchandise in the displayed states thereof.

The merchandise rotation processing section 171a is a processing section which first displays the basic image of the piece of merchandise on the display section 173 and after then rotates the piece displayed on the display section 173 in a direction in accordance with the input operation of the input section 172 and then displays the rotated piece.

Specifically, if the displayed image is clicked by the mouse of the input section 172 and the mouse is moved in the right direction with the image clicked thereby, the respective pieces of image data on the piece obtained when the piece is rotated in the right direction are displayed sequentially. When the movement of the mouse is stopped, the image data that corresponds to the amount of the movement of the mouse are displayed.

Also, the simulation processing section 171b is a processing section which, when one of various buttons of the piece of merchandise displayed on the display section 173 is selected by a mouse or the like, carries out the same processing as the function of the selected button.

For example, if a piece of merchandise displays a message on the LED portion thereof in response to any one of the buttons being pressed down, if the button is clicked by use of the mouse of the input section 172, then the message corresponding to the clicked button is displayed on the LED of the piece that is displayed on the display section 173.

Here, the simulation processing section 171b permits the above-mentioned operation to be carried out not only on a specific image to be displayed on the display section 173 but also on the respective images that are rotationally displayed on the display section 173 by the merchandise rotation processing section 171a.

In view of this, in the simulation processing section 171b, the buttons of a piece of merchandise are coordinate controlled for every image data and, if any mouse input is provided, determined it is checked to which button coordinates the present mouse input position corresponds. The button that corresponds to the present mouse input position is found and, after then, the processing routine that corresponds to the mouse input button is executed.

The input section 172 is an input device which includes a mouse and a keyboard, while the display section 173 is a display device such as a CRT or the like.

By using the HTTP server 12 and WS 17 respectively having the above-mentioned structures, not only the piece of merchandise registered on the HTTP server 12 can be rotated properly to thereby display various phases of the outer appearance of the piece on the display section 173, but also the function of the piece can be simulated while rotating the piece.

Although description has been given so far of only the case where the WS 17 requests the information on the piece of merchandise, the WS 14 and WS 15 belonging to the LAN 11 or various terminal devices, which are members of the INTERNET but are not shown, are also allowed to request the information on the piece of merchandise to the HTTP server 12.

Next, description will be given below of the processing procedures of the above-mentioned WS 17 and HTTP server 12.

Figure 2:
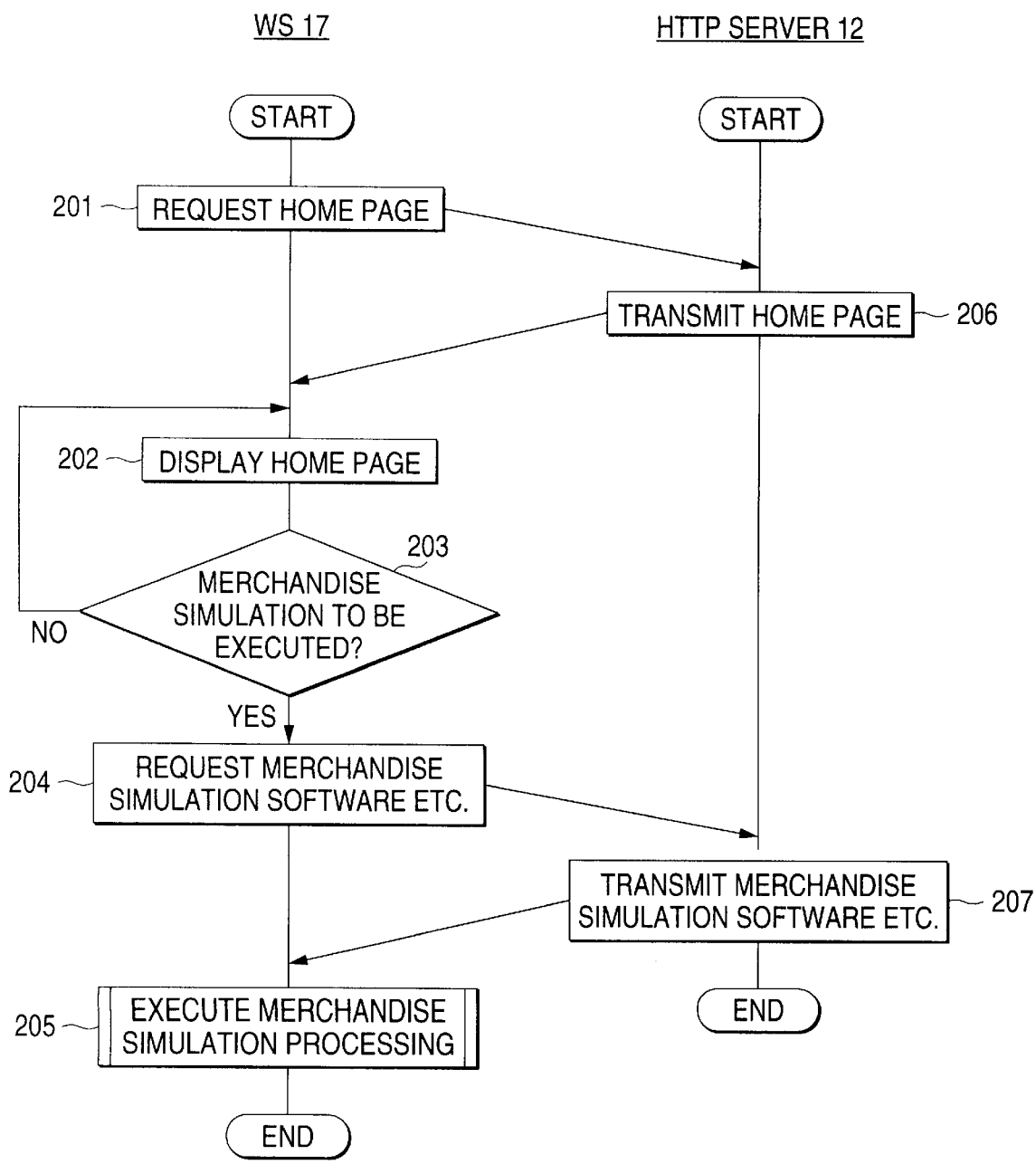
FIG. 2 is a flowchart of the processing procedures of a WS and an HTTP server respectively shown in FIG. 1.

FIG. 2 is a flowchart which shows the processing procedures of the WS 17 and HTTP server 12 respectively shown in FIG. 1.

As shown in FIG. 2, in response to a request from the WS 17 for a home page (Step 201), the home page is transmitted to the WS 17 from the HTTP server 12 (Step 206).

Then, after the WS 17 displays the home page on the display section 173 (Step 202), it waits for an input and, if a given input is provided, then the processing moves to a mode to simulate a piece of merchandise (Step 203).

For example, when the merchandise to be simulated is arranged in a portion of the home page, if a user handling the WS 17 selects a desired piece of the merchandise using the input section 172, then the processing is moved to the merchandise simulating mode.

In the merchandise simulating mode, the WS 17 requests the merchandise simulation software, simulation data and image data on the piece of merchandise to be simulated to the HTTP server 12 (Step 204) and, on receiving the present request, the HTTP server 12 transmits the merchandise simulation software, simulation data and image data on the present piece of merchandise to the WS 17 (Step 207).

On receipt of the present data, the WS 17 executes the merchandise simulation software to activate the merchandise simulation control section 171, thereby carrying out the simulation processing of the present piece of merchandise (Step 205).

Next, description will be given below of the merchandise simulation processing to be performed by the merchandise simulation control section 171 in the above-mentioned step 205.

Figure 3:
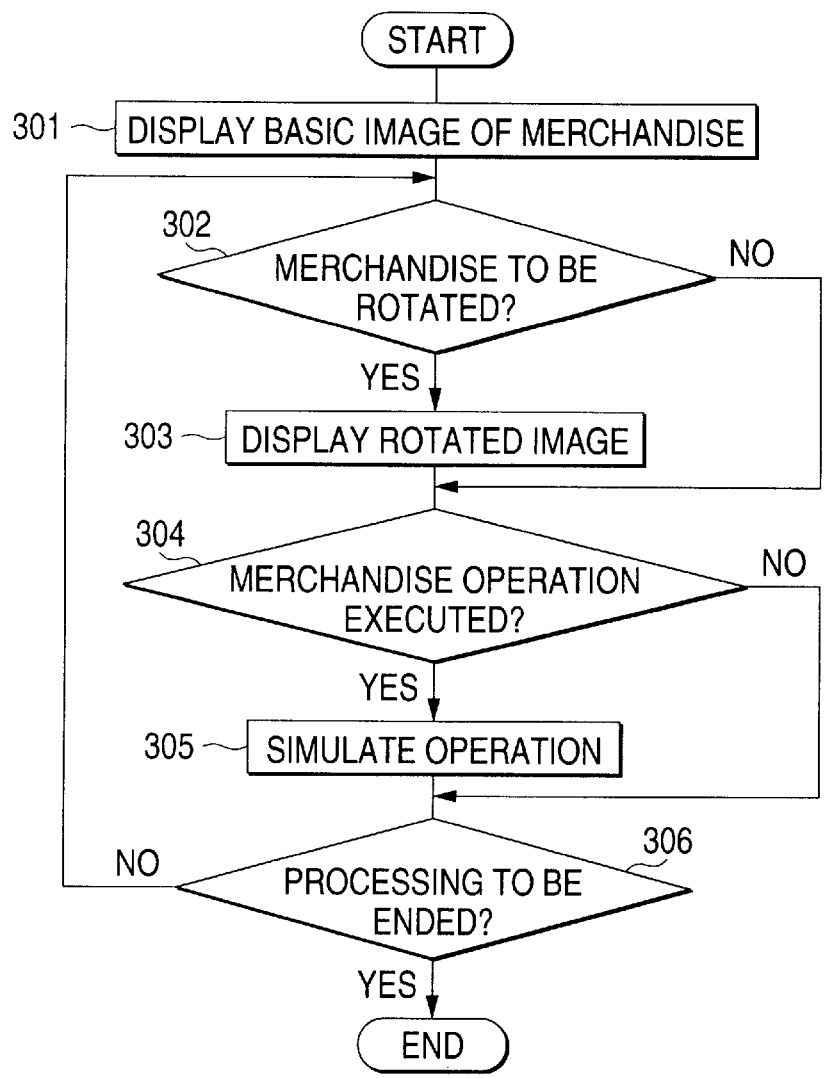
FIG. 3 is a flowchart of the processing procedure of a merchandise simulation control section shown in FIG. 1.

Here, FIG. 3 is a flowchart which shows the processing procedure of the merchandise simulation control section 171.

As shown in FIG. 3, if the merchandise simulation software 13a is executed, then the merchandise simulation control section 171 is activated, so that, at first, the processing displays the basic image of the piece of merchandise on the display section 173 and waits for an input (Step 301). Here, the basic image of the piece of merchandise means the image data that show the basic outer appearance of the piece such as the front view of the piece.

Next, if the rotation of the piece is specified by the input section 172 (Step 302), then the display of the image data of the piece displayed on the display section 173 is updated to the rotated image of the piece in correspondence to the input (Step 303).

For example, if the image data of the piece is once clicked by a mouse provided in the input section 172 and, while maintaining this clicked state, an operation to move a mouse cursor in a desired direction is carried out (which is hereinafter referred to as a "drag operation"), then the image displayed on the display section 173 can be rotated in a direction in which the drag operation is carried out.

However, the first embodiment is structured such that the image data displayed on the display section 173 are not rotated by an image processing but the display contents are updated by one more image data set previously prepared.

Next, if the button or the like of the piece of merchandise of which the image data are displayed is operated by the mouse (Step 304), then a simulating operation corresponding to the present button operation is carried out (Step 305).

For example, in the case of a piece of merchandise for which, if a certain button for the piece is pressed down, the contents of the present piece are displayed on the LED thereof, the image data displayed on the present LED in correspondence to the button are displayed on the display section 173. In particular, such a processing can be realized by replacing the image data displayed on the display section 173 by the image data displayed on the LED in correspondence to the button, or by displaying superimposingly not only the LED portion but also the image data on the display section 173.

When the operation of the piece of merchandise is not to be ended, the processing goes to Step 302 in order to be able to continue the rotation of the piece or the operation of the piece (Step 306), and, if a command to effect that the operation of the piece is to be ended is input, then the processing is ended as it is.

As described above, by carrying out the above-mentioned series of processings, the user can simulate the function of the piece while rotating the outer appearance of the piece properly. That is, the user can handle the piece as if the user was actually operating the piece at hand.

Next, description will be given below in detail of the merchandise simulating operation using the present merchandise simulator system with reference to a concrete embodiment in which a translator 40 is assumed as the piece of merchandise. Here, the present translator 40 is an assumed piece of merchandise employed for explanation of the present embodiment.

Figure 4:
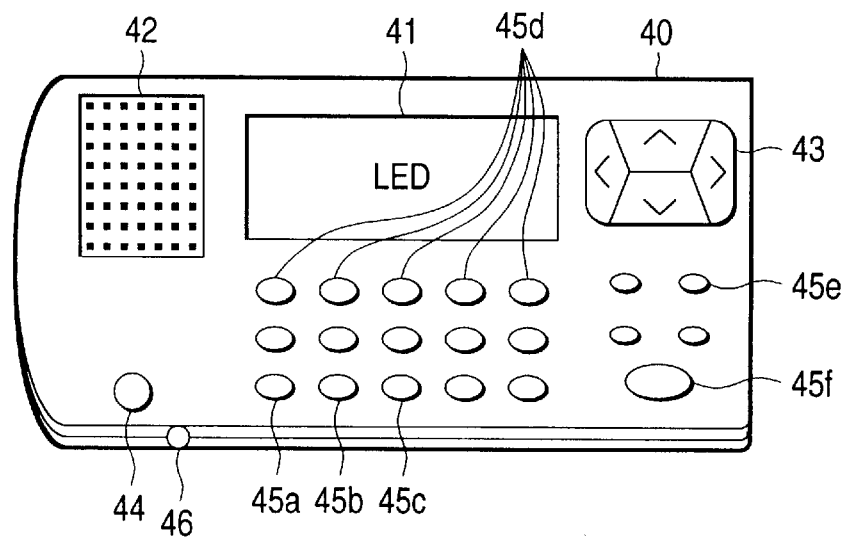
FIG. 4 is a view of a translator used in the first embodiment, showing the basic image thereof.

Now, FIG. 4 shows the basic image of the translator 40 used in the present concrete embodiment and, in particular, FIG. 4 shows the image data of the translator 40 obtained when it is viewed from front.

The translator 40 is a device which is able to display or vocalize Japanese, English and Chinese phrases for each of scenes and, as shown in FIG. 4, it comprises an LED 41, a speaker 42, arrow keys 43, a power supply button 44, input buttons 45a to 45f, a reset button 46 and the like.

Specifically, at first, if the power supply button 44 is turned on and any one of the scene buttons 45d is selected, then a plurality of items corresponding to the selected scene button are displayed. Next, if any of the items is selected by use of the arrow keys 43 and the set button 45e is then depressed, then a Japanese illustrative sentence corresponding to the selected item is displayed on the LED 41.

Next, in this displayed state, if either of the Chinese button 45a and the English button 45c is pressed down, then the present illustrative sentence is displayed in Chinese or in English on the LED and, if the voice button 45f is pressed down, then the present illustrative sentence is output as voices from the speaker 42.

In the merchandise simulator system used in the present embodiment, the simulation software and simulation data corresponding to the processing functions of the translator 40 as well as one or more sets of image data obtained when the translator 40 is viewed from various directions are stored in the storage unit 13 of the HTTP server 12, and, in response to a request from the WS 17 for the information on the translator 40, the simulation software, simulation data and image data on the translator 40 are transmitted to the WS 17.

If the WS 17 carries out the simulation software, then the basic image of the translator 40 shown in the display section 173 is firstly displayed and, next, if the drag operation by the mouse is executed, then the translator 40 is rotated in the drag direction.

For example, when the HTTP server 12 stores such image data on the translator 40 as shown in FIGS. 5(a) to 5(c), a user, who operates the WS 17, is allowed to rotate the translator 40 sequentially in the lateral direction thereof. On the other hand, when the HTTP server 12 stores such image data on the translator 40 as shown in FIGS. 5(d) to 5(f), the user is allowed to rotate the translator 40 sequentially in the longitudinal direction thereof.

Here, although in the present embodiment, for convenience of explanation, description has been given of an example using only the six sets of rotation image data shown in FIGS. 5(a) to 5(f), the larger the number of sets of such image data is, the more smoothly the translator 40 can be rotated on the display section 173.

Also, in a state in which the image data of the translator 40 are rotated, if the user uses the mouse to press down an arbitrary one of buttons of the translator 40 displayed on the display section 173, then the LED display or voice output can be carried out as if the user was actually operating the translator 40 at hand.

Now, FIG. 6 shows a relationship between the input operation of the input section 172 shown in FIG. 1 and the LED display of the translator 40.

As shown in FIG. 6, if the power supply button 44 of the translator 40 displayed on the display section 173 is clicked by a mouse provided in the input section 172 (Step 601), then a sentence "場所を選択して下さい" is displayed on the LED 41 (Step 602).

Next, if a scene button for sightseeing and amusement is selected out of the scene buttons 45d and is clicked by the mouse (Step 603), then a scene phrase "観光娯楽" and the first item "1. 観光案内" are displayed on the LED 41 (Step 604).

Further, if the set button 45e is clicked by the mouse (Step 605), then the first illustrative sentence "観光案内所はどこですか" contained in the item of the sightseeing is displayed on the LED 41 (Step 606).

Next, if the English button 45c is clicked by the mouse (Step 607), then the first illustrative sentence is translated into English and "Excuse me, but where's the tourist information counter ?" is displayed on the LED 41 (Step 608).

That is, since the relationship between the above-mentioned series of operations and the display on the LED 41 is the same as when the user operates the translator 40 actually at hand, the user is able to confirm the functions of the translator 40 on the WS 17 even if the translator 40 is not at hand.

Also, since the simulation of the translator 40 can be executed while rotating the translator 40 properly, the user can operate even the portions of the translator 40 (that is, the reset button 46 and voice volume 50) that cannot be seen visually from front of the translator 40.

That is, the user can experience the same operations on the WS 17 as when the user operates the translator 40 at hand.

Next, description will be given below of a table which is used by the simulation processing section 171*b* shown in FIG. 1.

In FIG. 7, there is shown an example of a table 70 used by the simulation processing section 171*b* shown in FIG. 1.

As shown in FIG. 7, in the table 70 used in the present embodiment, there are stored the position coordinates of the respective buttons that are set individually for the respective pieces of image data of the merchandise.

Figure 5:
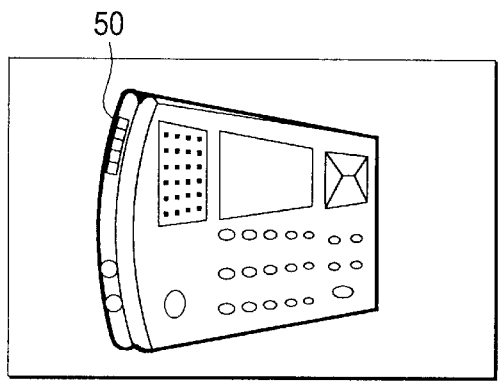
FIGS. 5(a) to 5(f) are views of the images of the translator shown in FIG. 4 which are necessary to rotationally display the translator.
Figure 5:
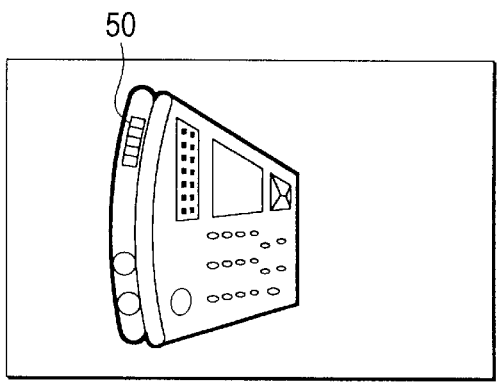
Figure 5:
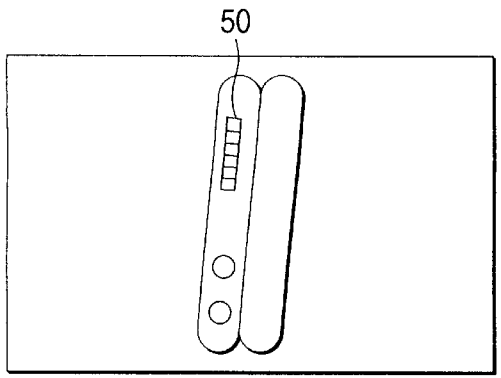
Figure 5:
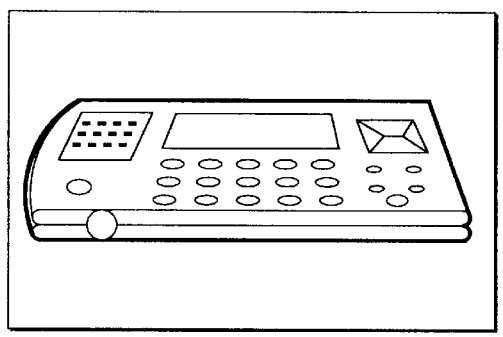
Figure 5:
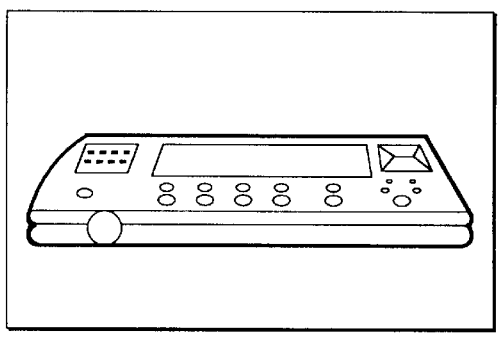
Figure 5:
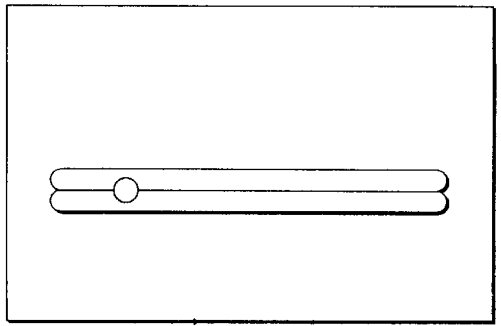

That is, since image data 1, image data 2 and image data 3 respectively shown in the table 70 are, for example, as shown in FIGS. 5(*a*) to (*c*), image data obtained when the piece of merchandise is viewed from different view points, even when the same button is identified, the position coordinates of the present button vary according to the respective image data.

For example, although the position coordinates of the power supply button 44 are set at (x0, y0) in the image data 1, they vary to (x0', y0') in the image data 2 and to (x0", y0") in the image 3, respectively.

Therefore, in the present table 70, the position coordinates of the respective buttons in the respective pieces of image data 1 to 3 are respectively stored, thereby being able to confirm which one of the buttons is specified by the mouse.

Here, for the purpose of simplified explanation, the position coordinates of the respective buttons are shown by points (x, y). However, actually, areas respectively corresponding to the shapes of the respective buttons are allotted to such position coordinates.

As has been described so far, according to the structure of the first embodiment, when the merchandise simulation software 13*a* received from the HTTP server 12 is executed by the WS 17, the merchandise simulation control section 171 is activated on the WS 17 and the basic image of the present piece of merchandise is displayed on the display section 173. Next, if the drag operation is performed by use of the mouse of the input section 172, then the piece displayed on the display section 173 is rotated in accordance with the two or more pieces of image data received from the HTTP server 12. Also, if any mouse input is given to the button or the like of the image data displayed on the display section 173, then the function of the present piece of merchandise is surely simulated in whatever state the piece displayed on the display section 173 is displayed. Thanks to this structure, the user can operate the piece on the WS 17 as if the user was using the piece actually at hand.

In the foregoing description, the first embodiment of the invention has been discussed.

By the way, in the above-discussed first embodiment, since the one or more sets of image data obtained based on the different view points of the piece of merchandise are previously stored, in order to rotate the piece as if it was handled actually at hand, it is necessary to previously store a large number of sets of image data.

For this purpose, it is desirable to employ an image processing technology which forms image data on the different view points of the piece based on the standard image data of the piece, thereby being able to limit the number of pieces of the image data to be stored to a predetermined number.

In view of this, next, description will be given below of a second embodiment which rotates the piece of merchandise by use of an image processing technology.

Figure 8:
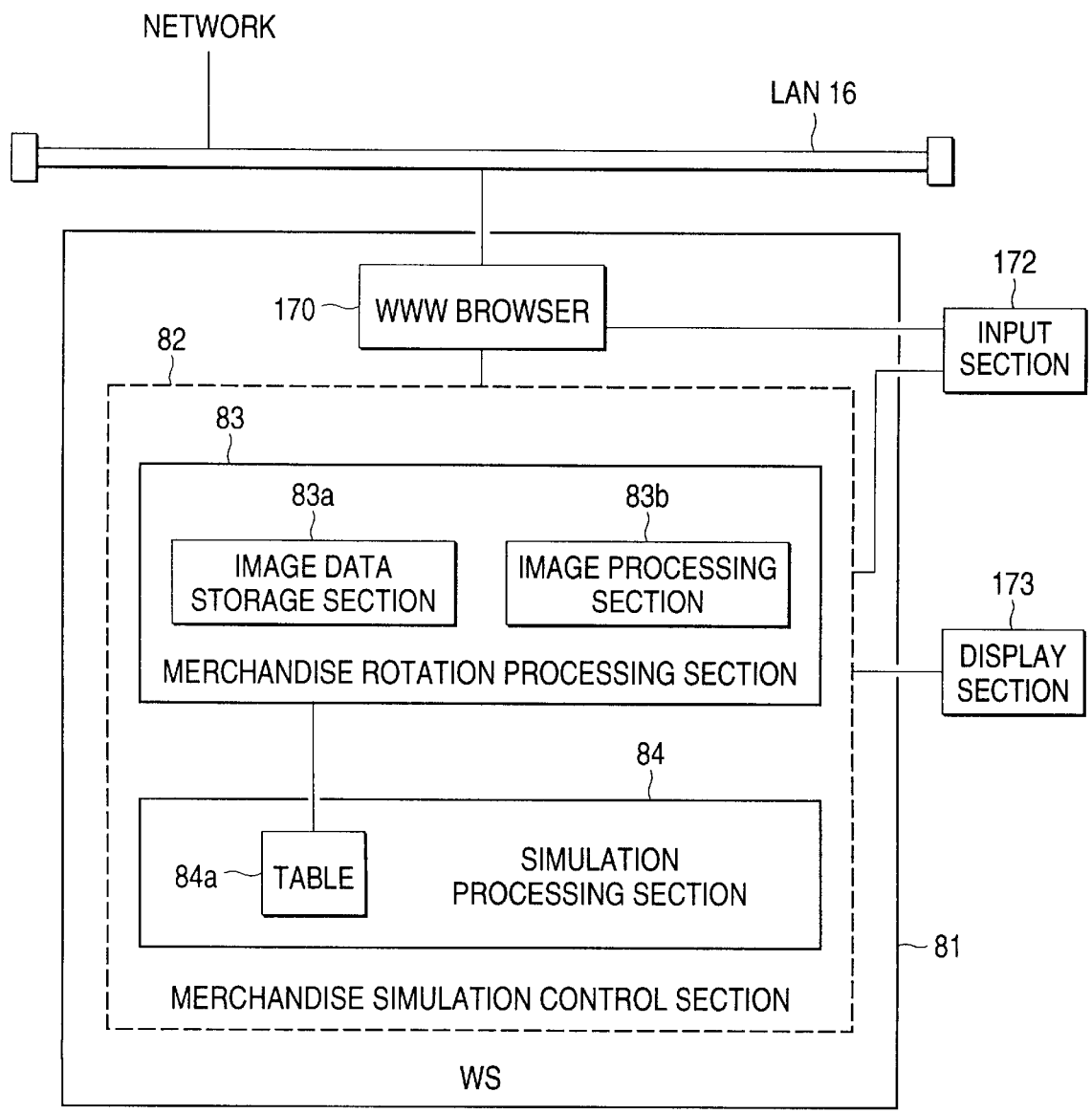
FIG. 8 is a block diagram of the structure of a WS used in a second embodiment of the invention.

That is, in FIG. 8, there is shown a structure of a WS 81 which is used in the second embodiment.

The WS 81, similarly to the WS 17 shown in FIG. 1, is a member terminal which belongs to the LAN 16 and also the WS 81, similarly to the WS 17, receives simulation software, image data and table from the HTTP server 12 and executes a simulating operation.

As shown in FIG. 8, the WS 81 comprises a WWW browser 170, a merchandise simulation control section 82, an input section 172, a display section 173 and the like. However, the merchandise simulation control section 82 is allowed to fulfill its function only when the merchandise simulation software 13*a* received from the HTTP server 12 shown in FIG. 1 is activated.

The WWW browser 170, input section 172 and display section 173 are similar in function to those shown in FIG. 1 and thus the detailed description thereof is omitted here.

The merchandise simulation control section 82, similarly to that of the WS 17 shown in FIG. 1, is a function section which is enabled by activating the merchandise simulation software 13a received from the HTTP server 12, while the merchandise simulation control section 82 comprises a merchandise rotation processing section 83 which rotates the respective pieces of merchandise displayed on thie display section 173 in a desired direction, and a simulation processing section 84 which simulates the functions of the respective pieces of merchandise in their various display states.

The merchandise rotation processing section 83 is a processing section which, at first, displays the basic image of the present piece of merchandise on the display section 173 and, in accordance with the input operation of the input section 172, rotates the piece displayed on the display section 173 in the input operation direction and displays the thus rotated piece on the display section 173.

However, the merchandise rotation processing section 83 does not rotate the piece of merchandise simply by updating the image data thereof but rotates the piece by use of an image processing technology which forms image data on the different view points of the piece in accordance with the standard image data of the piece.

In particular, the merchandise rotation processing section 83 stores therein a wire frame representing the outer appearance of the piece of merchandise and the standard image data of the piece obtained when the piece is viewed from various view points and, if the wire frame is updated in response to the input operation of the input section 172, then the merchandise rotation processing section 83 forms the image data of the piece corresponding to the updated wire frame using the standard image data. Also, the merchandise rotation processing section 83 includes therein an image data storage section 83*a* and an image processing section 83*b*.

The image data storage section 83*a* is a storage section which stores the standard image data of the piece when the piece is viewed from its front surface, back surface, side surfaces, upper surface and lower surface, for example. On the other hand, the image processing section 83*b* is a processing section which, when an rotation operation is performed on the piece displayed on the display section 173, detects the rotation operation on the wire frame and creates the image data fittable in the updated wire frame based on the image data stored in the image data storage section 83*a*.

Further, the simulation processing section 84 is a processing section which, when any one of the various buttons displayed on the display section 173 is selected by a mouse or the like, performs the same processing as the function of the selected button, while the simulation processing section 84 includes therein a table 84*a* which stores a correspondence relationship between the respective buttons and the position coordinates in the image data.

The position coordinates of the respective buttons stored in the table 84*a*, each time the merchandise rotation processing section 83 creates new image data, are updated sequentially so as to be able to correspond to the newly created image data.

Thanks to this, the simulation processing section 84 can receive a directive operation to be performed on the respective images rotationally displayed on the display section 173 by the merchandise rotation processing section 83 and also can execute a simulation operation corresponding to the present directive operation.

Due to use of the WS 81 having the above-mentioned structure, the image data on the piece of merchandise in response to the input operation of the input section 172 can be sequentially created in accordance with the standard image data of the present piece and displayed on the display section 173 and, at the same time, a simulating operation corresponding to the button operation of the piece displayed on the display section 173 can be executed.

Next, description will be given below of the processing concept of the image processing section 83*b* shown in FIG. 8.

Figure 9:
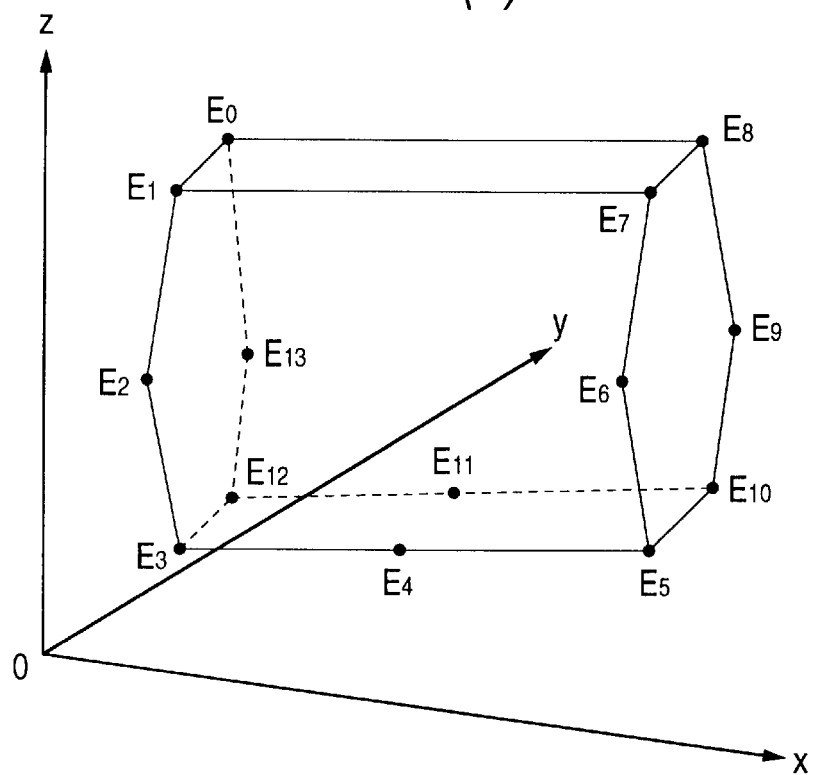
FIGS. 9(a) and 9(b) are explanatory views of the processing concept of an image processing section shown in FIG. 8.
Figure 9:
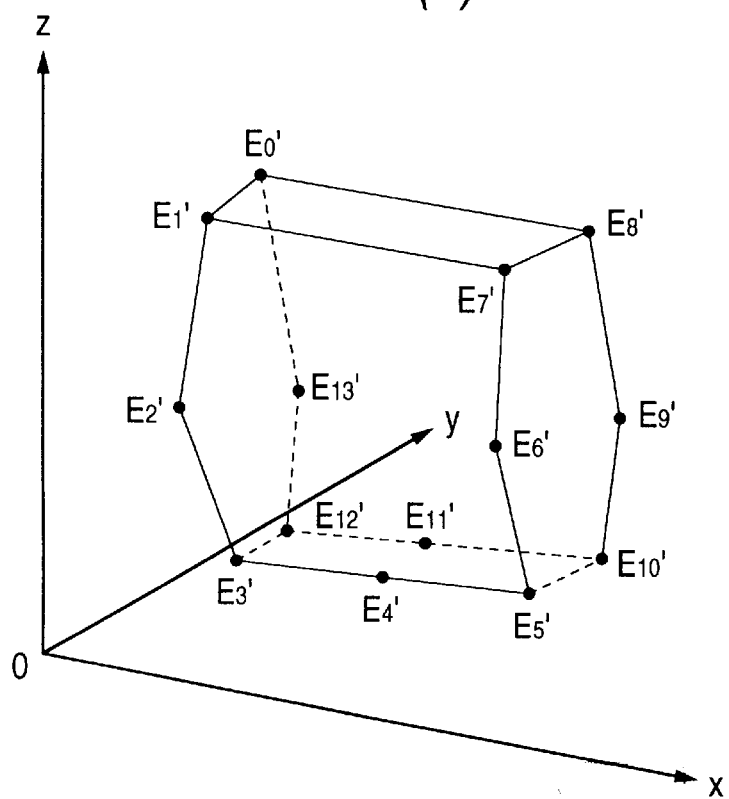

FIGS. 9(*a*) and 9(*b*) are explanatory views of the processing concept of the image processing section 83*b* shown in FIG. 8.

As shown in FIG. 9(*a*), in the image processing section 83*b*, a wire frame, which connects the feature points of the outer appearance of the piece of merchandise with one another by means of lines or curved lines, is stored in a three-dimensional space which consists of an x coordinate, a y coordinate, and a z coordinate.

Also, the image processing section 83*b* creates the image data of the piece of merchandise obtained when the piece is viewed from an arbitrary view point such as the origin or the like on the basis of the standard image of the present piece stored in the image storage section 83*a*, and displays the thus created image data on the display section 173.

If a merchandise rotation operation is performed using the mouse of the input section 172, then the image processing section 83*b* changes the above-mentioned wire frame to such a new wire frame as shown in FIG. 9(*b*) in response to the merchandise rotation operation, creates the image data of the piece corresponding to the thus changed wire frame in accordance with to the standard image of the piece similarly to the above-mentioned case, and then displays the thus created image data on the display section 173.

Also, when such a display change is made, the position coordinates of the button of the piece that are stored in the table 84*a* are updated in accordance with the amount of displacement of the wire frame.

However, when creating the image data of the piece after it is rotated on the basis of the standard image data of the piece, an image processing is performed on each of the image data of the piece corresponding to the surfaces thereof that can be viewed from the view points and, after then, the thus processed image data on the respective surfaces are combined together.

In the present embodiment, description has been given of a case in which the image data on the respective surfaces of the piece of merchandise are used as the standard image thereof. However, the image data obtained when the piece is viewed from a plurality of arbitrary view points or graphic data created by computer graphics can also be used.

Next, description will be given below of the table 84*a* shown in FIG. 8.

Figure 10:
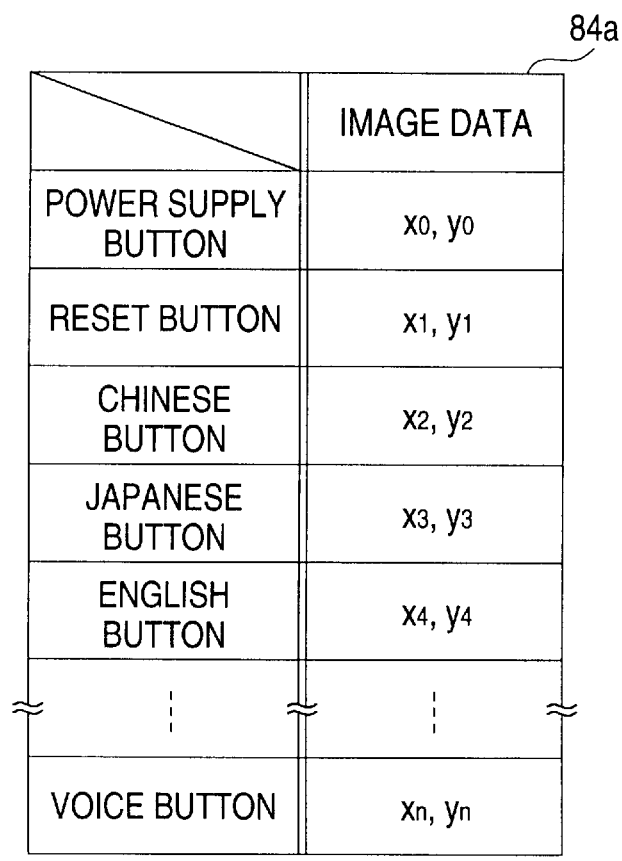
FIG. 10 is a view of an example of a table shown in FIG. 8.

That is, FIG. 10 shows an example of the table 84*a* shown in FIG. 8.

As shown in FIG. 10, the table 84*a* is a table which stores therein the position coordinates of the respective buttons in the image data.

Each time a wire frame of the piece of merchandise is rotated by the input provided by the input section 172, the position coordinates of the respective buttons stored in the table 84*a* are updated sequentially on the basis of the displacement amount of the wire frame. The reason for such sequential updating of the position coordinates is to be able to recognize an operation input into the button that is contained in the image data after the wire frame is rotated.

As mentioned above, since the position coordinates of the respective buttons stored in the table 84*a* are updated sequentially in correspondence to the rotation input of the piece by the input section 172, there is eliminated the need to store the position coordinates of the respective buttons for every piece of image data as in the table 70 shown in FIG. 7.

As has been described so far, according to the structure of the second embodiment, when the WS 81 executes the merchandise simulation software 13*a* received from the HTTP server 12, the merchandise simulation control section 82 is activated on the WS 81 to thereby display the basic image of the present piece of merchandise on the display section 173. After then, if the rotation operation of the piece by the input section 172 is carried out, then the image data corresponding to the present rotation operation are formed in the image processing section and are displayed on the display section 173 and, if any directive input is given to a button or the like of the displayed image data, the simulation processing section 84 performs a simulation operation corresponding to the present directive input. Thanks to this structure, there can be obtained the following effects.

1) A user is allowed to operate the piece of merchandise on the WS 80 as if the user was using the piece actually at hand.

2) The number of pieces of the image data to be stored can be reduced.

In the above-mentioned first and second embodiments, description has been given of the case in which the present invention is applied to the WWW. However, the present invention is not limited to this but, for example, the invention may also be structured as a stand-alone type simulator device or system which can be operated on the WS 17.

Further, in the first and second embodiments, description has been given of the case in which the function of the translator 40 is simulated. However, this is not limitative but the present invention may be applied widely to various kinds of merchandise.

According to the invention, a user can operate the operation part of a piece of merchandise on the client as if the user was using the present piece actually at hand. Further, the respective clients, which are members of a wide area network such as the INTERNET or the like, are allowed to remotely operate the piece of merchandise so that the value thereof can be recognized sufficiently. Furthermore, it is possible to execute a simulating operation in which a button for the piece of merchandise can be operated properly while rotating the present piece.

What is claimed is:

1. A merchandise simulator system comprising:

a server for providing merchandise image data and merchandise simulation software;

and a client comprising a display section for displaying a piece of merchandise, an input section for executing a position instruction in the display sections and a browser for requesting information on the piece of merchandise to the server, wherein the server and client is connected to each other through a network, and wherein said server comprises:

storage means for storing one or more sets of merchandise image data, each set of merchandise image data representing the piece of merchandise when viewed from a different viewpoint, position information representing the position of one or more operational parts of the piece of merchandise for each set of merchandise image data, and simulation software for displaying the piece of merchandise, modifying the displayed piece of merchandise in response to an input operation executed by the input section, and simulating operation of one or more operational parts of the piece of merchandise in response to a position instruction implemented by the input section; and transmission means for transmitting the merchandise image data, position information and simulation software respectively stored in said storage means to said client in response to a request from said client.

2. A merchandise simulator device comprising:

a display section for displaying a piece of merchandise;

an input section for executing a position instruction in the display section;

display control means for rotating the piece of merchandise according to an input operation provided by said input section and displaying the rotated piece of merchandise based on stored merchandise image data; and simulating means for simulating the operation of one or more operational parts of the piece of merchandise based on a position instruction given by said input section.

3. A merchandise simulator device comprising:

a display section for displaying a piece of merchandise;

an input section for executing a position instruction in the display section;

storage means for storing one or more sets of merchandise image data, each set of merchandise image data representing;

display control means for deleting displayed merchandise image data from said display section when the piece of merchandise is rotated in response to an input operation;

control means for modifying the position information of the one or more operational parts of the piece of merchandise in each of the one or more sets of merchandise image data stored in said storage means to reflect the rotated position of the piece of merchandise; and simulating means for simulating the operation of the one or more operational parts of the piece of merchandise based on the position instruction given by said input section.

4. The merchandise simulator device set forth in claim 3, wherein said storage means stores one or more sets of merchandise image data, each set of merchandise image data representing the piece of merchandise in a position rotated sequentially by a given angle with respect to at least one rotary axis thereof, and said display control means displays sequentially the one or more sets of stored merchandise image data to thereby rotationally move the displayed piece of merchandise in response to an input operation executed by said input section.

5. A merchandise simulator device comprising:

a display section for displaying a piece of merchandise;

an input section for executing a position instruction in the display section;

storage means for storing one or more sets of merchandise image data representing the piece of merchandise when is viewed from a given view point;

calculating means for calculating one or more sets of merchandise image data obtained when the view point of the displayed piece of merchandise is modified and position information representing the position of one or more operational parts of the piece of merchandise in each of the one or more sets of merchandise image data;

display control means for displaying the piece of merchandise based on the merchandise image data calculated by said calculating means in response to a given input operation by said input section; and simulating means for simulating the operation of the one or more operational parts of the piece of merchandise based on the position information calculated by said calculating means and a position instruction given by said input section.

* * * * *

UNITED STATES PATENT AND TRADEMARK OFFICE
CERTIFICATE OF CORRECTION

PATENT NO. : 5,880,974
DATED : March 9, 1999
INVENTOR(S) : Hiroaki TARUMI et al.

It is certified that error appears in the above-identified patent and that said Letters Patent is hereby corrected as shown below:

On the title page, item [54] and column 1, line 2, "DEVICES" should read --DEVICE--.

Claim 1, Col. 15, line 9, "sections" should read --section,--.

Claim 5, Col. 16, line 34, before "viewed" delete "is".

Signed and Sealed this

Thirty-first Day of August, 1999

Attest:

Q. TODD DICKINSON

*Attesting Officer*    Acting Commissioner of Patents and Trademarks